Patented Apr. 29, 1930

1,756,275

UNITED STATES PATENT OFFICE

ABRAHAM SIDNEY BEHRMAN, OF CHICAGO, ILLINOIS, ASSIGNOR TO GENERAL ZEOLITE COMPANY, OF CHICAGO, ILLINOIS, A CORPORATION OF ILLINOIS

LIQUID TREATMENT

No Drawing.    Application filed May 23, 1929.   Serial No. 365,581.

The present invention relates to a process for treating liquids, and it particularly relates to a process of treating water with zeolites in such a manner as to change the character of the chemical compounds contained therein.

One object of this invention is to provide an improved process for zeolitically treating water.

Another object of this invention is to provide an improved process for increasing the alkaline earth compounds in solution and decreasing the amount of alkali metal compounds in solution.

A further object of this invention is to provide a process of purifying sodium carbonate or sodium bicarbonate waters.

A particular object of the present invention is to provide a method of treating water so that it may be readily utilized for the manufacture of ice.

Other objects will appear during the course of the following description.

The present invention will be particularly described in connection with the treatment or purification of natural waters high in alkali metal carbonates, such as sodium carbonate or sodium bicarbonate, so that such waters may be readily utilized for the manufacture of ice. It is to be understood, however, that the process is of much wider application and may be broadly utilized for decreasing the concentration of inorganic materials in solution. The water so produced may also be employed for boiler feed or other purposes. The present invention is particularly adapted to remove a large proportion of the solid inorganic compounds in solution, especially when such inorganic compounds are present in the form of sulphates or carbonates. It is also adapted to replace the metallic ions with predetermined alkaline earth metal ions if they are not already in such form. In a preferred embodiment of the invention, all the alkali metal ions, such as sodium and potassium, are replaced by alkaline earth metal ions such as calcium and/or magnesium. It is desirable to replace calcium and other heavy ions by magnesium ions, and in one embodiment of the invention, all other metallic ions are substantially completely replaced by magnesium ions.

A water which may be very satisfactorily treated by the process of the present invention is one which contains about 200 to 1000 parts per million of sodium bicarbonate expressed in terms of sodium carbonate.

In a preferred embodiment of the invention, the water is preferably passed through a bed of calcium or magnesium zeolite. This zeolite may be a synthetic material, of a porous gel-like or other structure, or it may be in the form of a treated naturally occurring double base exchange silicate. It is obvious that other zeolites may also be utilized. If these zeolites are not already in the form of their calcium or magnesium compounds, they are converted into such form by treatment with strong solutions of calcium chloride and/or magnesium chloride, preferably the latter. If desired, magnesium sulphate or other sufficiently soluble magnesium or calcium salts may be utilized in place of the chlorides.

The zeolite may also be converted into the form of its strontium or barium compound, but this is not usually desirable.

The water may be passed in either direction through the zeolite bed. Since there may be a tendency for certain of the materials formed by the zeolitic reaction to precipitate out and coat the zeolite particles, it is desirable that the water be passed through the bed at such a speed and/or with such agitation that the substances tending to precipitate will be kept either in solution or in the form of a very finely divided suspension which may be readily carried out of the zeolite bed by the flow of water. To prevent coating of the zeolite particles or to avoid settling out of any precipitate during passage through the zeolite bed, it has been found desirable in some instances to pre-carbonate the water, that is, to add carbon dioxide, before passing it through the zeolite bed. This is done in order to insure the retention in solution of the calcium and/or magnesium bicarbonates formed by the zeolitic reaction, and to prevent the conversion of the bicarbonates into the less soluble normal carbonates. It is a fact that the solubility of normal magnesium carbonate is considerably greater than that of normal calcium carbonate which accounts in part for the preferred employment of magnesium zeolites, although the magnesium bicarbonate formed in the zeolitic reaction requires twice as much lime for its removal as is required for the removal of its equivalent of calcium bicarbonate. Another advantage of using magnesium zeolites is that upon the subsequent precipitation with lime the magnesium is preferably removed as magnesium hydroxide, the solubility of which is considerably lower than that of calcium carbonate. This pre-carbonation operation may be replaced in whole or part by the addition of very weak acid materials to the influent liquid. These acid materials may consist of the acid salts of calcium or magnesium, such as calcium and magnesium acid phosphates, but small amounts of acids may also be utilized.

After the water is passed through the zeolite bed, the alkaline earth carbonates or other compounds formed may be precipitated. The precipitation may be effected by heat and/or a vacuum, but it is preferably caused to take place by means of an alkaline reagent, such as lime. Lime is especially advantageous in that in combining with the half-bound carbon dioxide of the calcium and/or magnesium bicarbonates, it not only precipitates the calcium and magnesium of the bicarbonates, but is itself converted into an insoluble compound. In place of lime, other reagents may be employed, as for example mixtures of lime and barium hydroxide, or barium hydroxide alone may be very satisfactorily utilized. Barium hydroxide, or mixtures containing barium hydroxide, are especially advantageous in causing substantially complete removal of magnesium sulphate, and in some cases also of calcium sulphate, since the calcium hydroxide produced by the reaction between the calcium sulphate and the barium hydroxide may be removed by further combination with the calcium bicarbonate and/or the magnesium bicarbonates and/or carbonates present in such liquids. Barium carbonate may also be used in place of, or in addition to, barium hydroxide particularly when the precipitation reactions are carried out with the aid of heat.

The following equations illustrate the course of some of the more important chemical reactions described above.

In the treatment of the raw water with the zeolite:

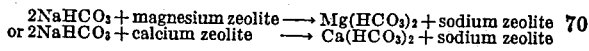

In the regeneration of the zeolite:

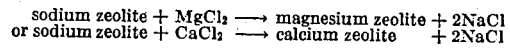

In case heat and/or vacuum is used to break up the bicarbonates:

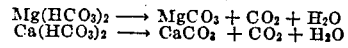

When lime or calcium hydroxide is used after the zeolite treatment:

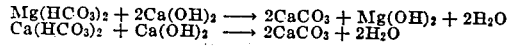

In case barium hydroxide is used after a treatment with a magnesium zeolite:

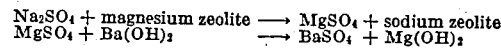

In case barium hydroxide is used after a treatment with a calcium zeolite:

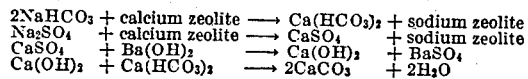

In case barium carbonate is used after a treatment with calcium zeolite:

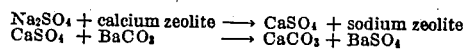

When lime is used after the zeolite treatment a slight excess may be added to advantage. With the lime or other precipitating agent may be added a small amount of aluminum sulphate and/or sodium aluminate. Chlorinated copperas, ferric chloride and other materials adapted to produce coagulation may also be employed. The precipitate which will form is removed from the liquid either by sedimentation and/or filtration, and if desired this precipitate may be added to a fresh supply of water which has been treated with the zeolite in the manner described above with or in addition to the precipitating agent and/or coagulating material.

After these treatments the water will contain a greatly decreased amount of soluble impurities. The residual soluble impurities will be principally alkaline earth chlorides. If desired, these impurities may be readily removed by a process of electro-osmotic purification. If it is desirable to convert the alkaline earth salts into alkali metal salts, this may be readily done by passing the liquid through a sodium or potassium zeolite and/or by adding a small amount of sodium carbonate. In one embodiment of the invention the sodium carbonate may be provided by only partially treating the water with alkaline earth zeolites or by mixing some of the untreated raw liquid containing sodium bicarbonate with the treated water.

Although water produced by the process of the present invention may be widely utilized, it is especially adapted to be employed in the production of ice. Not only is the total amount of soluble impurities decreased, but the removal of sodium bicarbonate is especially advantageous since this substance has a marked tendency to cause ice to be brittle as well as to make it opaque.

Many modifications and changes may be readily made in the process of the invention described above. The modifications and changes are all within scope of the present invention.

What is claimed is:

1. A process of treating water for ice making which comprises subjecting the water to treatment with alkaline earth zeolites and then with lime.

2. A process of treating water which comprises carbonating the water, treating it with an alkaline earth zeolite, and finally precipitating alkaline earth compounds.

3. A process of treating water high in alkali metal carbonates and bicarbonates which comprises passing the water through a bed of zeolites containing exchangeable magnesium, and then treating with a soluble hydroxide.

4. A process of treating water high in alkali metal salts, which comprises subjecting the water to treatment with a magnesium zeolite and then with lime.

5. A process of treating water which comprises subjecting the water to treatment with an alkaline earth zeolite, adding lime to the treated water, separating the precipitate and then subjecting the water to treatment to replace the residual alkaline earth salts with alkali metal salts.

6. A process of treating waters high in alkali metal bicarbonates and carbonates which comprises subjecting the water to treatment with alkaline earth zeolites and then with a soluble alkali forming metal hydroxide.

7. A process of treating water which comprises carbonating the water, treating it with an alkaline earth zeolite, and finally decreasing its acidity.

8. A process of treating water which comprises subjecting the water to treatment with an alkaline earth zeolite, treating with lime, separating the precipitate and then subjecting the water to treatment with an alkali metal zeolite.

In testimony whereof I have hereunto subscribed my name.

ABRAHAM SIDNEY BEHRMAN.